April 21, 1931. A. R. CAMPBELL ET AL 1,801,658
TRACTOR DEVICE TO PROVIDE THREE SPEEDS IN REVERSE FOR SAID TRACTOR
Filed April 14, 1927 2 Sheets-Sheet 1

INVENTORS
ALVIN R. CAMPBELL
CHARLES D. DRAPER
BY
ATTORNEY

April 21, 1931.  A. R. CAMPBELL ET AL  1,801,658
TRACTOR DEVICE TO PROVIDE THREE SPEEDS IN REVERSE FOR SAID TRACTOR
Filed April 14, 1927  2 Sheets-Sheet 2
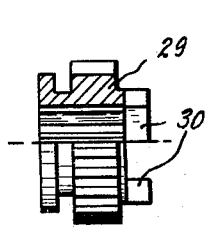
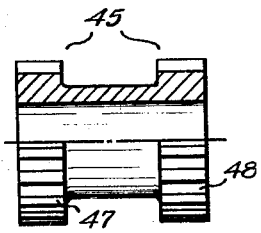
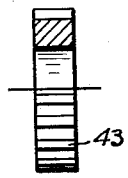
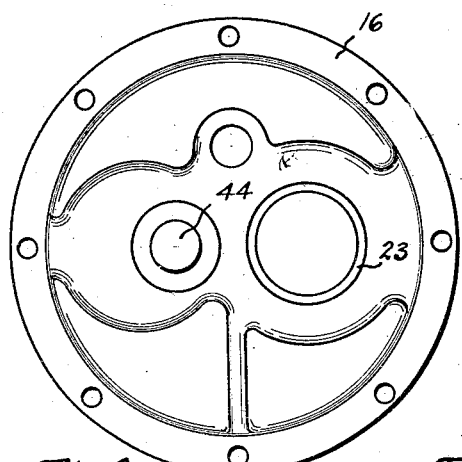
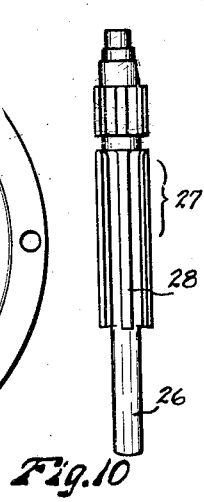
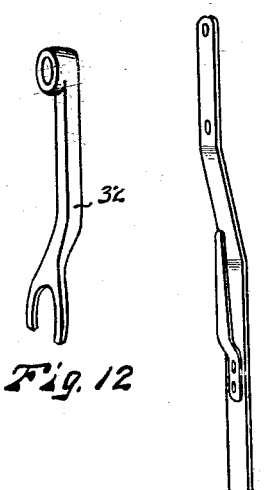
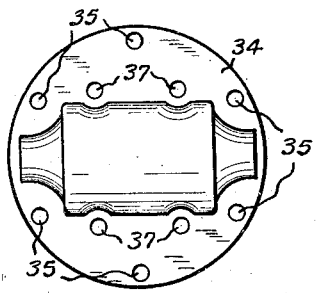
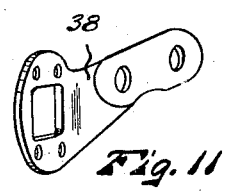
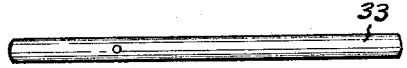
INVENTORS
ALVIN R. CAMPBELL
CHARLES D. DRAPER
BY
ATTORNEY Patented Apr. 21, 1931

1,801,658

UNITED STATES PATENT OFFICE

ALVIN R. CAMPBELL, OF SAN FRANCISCO, CALIFORNIA, AND CHARLES D. DRAPER, OF SEATTLE, WASHINGTON

TRACTOR DEVICE TO PROVIDE THREE SPEEDS IN REVERSE FOR SAID TRACTOR

Application filed April 14, 1927. Serial No. 183,772.

Our invention relates to a tractor device to provide three speeds in reverse for said tractor.

As manufactured the tractor is often made with but one speed for reverse. There are, however, exceptional uses where it is desirable that said tractor should have three speeds in reverse. The purpose of our invention is to provide such a device for the said tractor.

The construction of the tractor transmission housing is often of such a compact character that there is little room for the provision of the necessary extra gears to provide for the three speeds in reverse. Thus is presented a difficult problem owing to the lack of room for the gears and pinions, and for their mounting means.

Further, there is the problem of lubrication. (As the tractor is often manufactured the transmission drive shaft is mounted in the upper part of the transmission plate.) To provide for the proper lubrication of the extra gears, pinions and shafts incident to the device in question, the problem in part is to provide this mounted upon the lower part of the transmission plate, so that it is at all times lubricated whenever there is any lubricant in the transmission housing (at least until the lubricant is at an extraordinarily low level), and at the same time such location of the extra shafts, pinions and gears involves the problem of special mounting means.

Furthermore, in addition to the gears and shafts directly involved in a device of the character described there is the further necessity of providing for a special gear shifting device to provide for engagement and non-engagement of the extra gears involved in providing the extra speeds in reverse.

A further condition which is particularly difficult and involved has been the providing of a suitable bearing for the driven gear which may be mounted in the transmission housing plate, the space being so limited there is great difficulty involved in providing a sufficient length of bearing to provide the requisite rigidity to avoid axial deflection.

A further fundamental requisite and condition has been the requirement for durability of all the parts. Devices that seem to solve the problem have been proven entirely inadequate as respects their durability.

Our primary object has been to overcome all of these several and various objections, and to devise for the tractor a device which would provide three speeds in reverse, and so disposed as to have long wearing qualities.

The above mentioned general objects of our invention, together with others inherent in the same, are attained by the device illustrated in the following drawings, the same being merely preferred exemplary forms of embodiment of our invention, throughout which drawings like reference numerals indicate like parts:

Fig. 6 is a view of the sliding driving pinion.

Fig. 7 is a view of the gear spool.

Fig. 8 is a view of the idler gear.

Fig. 9 is a view of the transmission housing plate.

Fig. 10 is a view of the engine driven spline shaft.

Fig. 11 is a view of the shaft mounting bracket.

Fig. 12 is a view of the shifting fork.

Fig. 13 is a view of the shifter housing.

Fig. 14 is a view of the shifter shaft.

Fig. 15 is a view of the shifting lever.

Figures 1, 3:
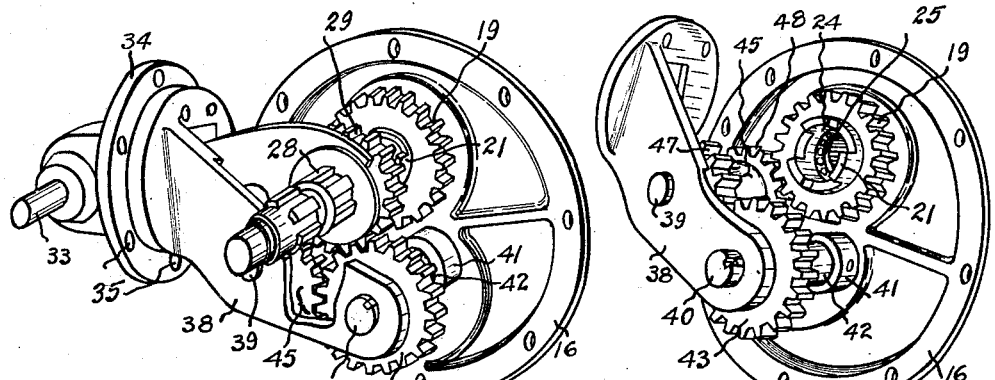
Figure 1 is a view in perspective of a device embodying our invention with a part broken away to disclose some of the underlying parts.
Fig. 3 is a view of the same with some of the gears removed.
Figures 2, 5:
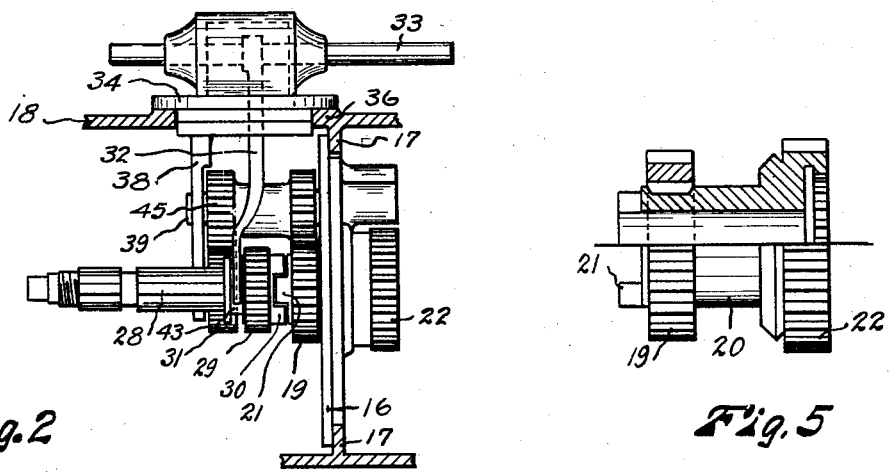
Fig. 2 is a plan view of the same.
Fig. 5 is a view of the driven gear and a ring gear mounted thereon.
Figure 4:
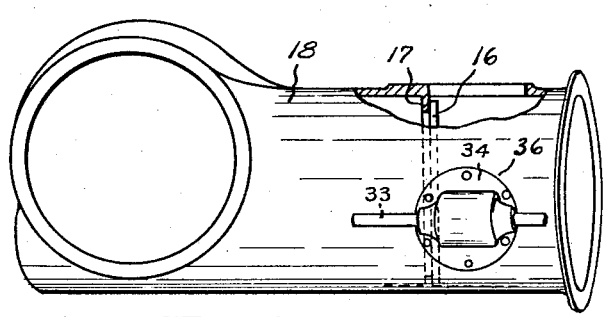
Fig. 4 is a view of the transmission housing with a part broken away to show the transmission plate in position.

A transmission housing plate 16 is operatively mounted on a flange 17 of transmission housing 18. Upon said plate a driven gear 19 is rotatively mounted. This is formed with a bearing 20, which bearing has the clutch means 21 preferably six in number. This driven gear is formed by driving what is technically known as a ring gear upon the bearing and keyed thereto while on the opposite side of the transmission plate and integrally formed with said bearing is the transmission drive shaft gear 22, ball bearing 23 being provided for said bearing in said transmission plate. In said bearing 20 there is an axially disposed shaft mounting recess 24 in which roller bearing 25 is positioned to receive the rounded end portion 26 of engine driven spline shaft 27 having splines 28 intermediate its ends. Upon this shaft 27 is combined sliding driving clutch pinion 29 having clutch means 30 engageable with clutch means 21 of the driven gear. The said pinion 29 has shifter fork groove 31 in which shifter fork 32 is mounted. Shifter fork 32 is fixedly mounted upon shifter shaft 33 which is operatively disposed in shifter housing 34, which housing in turn is provided with bolt holes 35, whereby the same may be mounted upon the power take-off part flange 36 of the transmission housing 18.

By means of bolt holes 37 a shaft mounting bracket 38 is rigidly mounted upon said shifter housing 34. This bracket provides mounting means for one end of the spool gear shaft 39 and the idler gear shaft 40. The other end of idler gear shaft 40 is mounted in a boss 41 welded upon transmission housing plate 16. Upon the idler gear shaft 40 is disposed spacing sleeve 42 whereby idler gear 43 is held in proper alignment. The other end of spool gear shaft 39 is mounted in the bearing 44 in the transmission plate 16 which bearing originally is provided for the idler gear shaft of the tractor as manufactured. Upon said spool gear shaft 39 spool gear 45 is idly mounted. A shifter lever 46 is operatively mounted with respect to shifter shaft 33.

The mode of operation of a device embodying our invention is as follows:

While the engine is idling the position of the combined sliding driving clutch pinion 29 would be in the center of the spline portion of the engine driven spline shaft 27. When it is desired to run forward with the tractor the said combined sliding driving clutch pinion 29 is moved backwards so that clutch means 30 engages clutch means 21 of the bearing 20 of the driven gear 19. In this position the speed forward depends entirely upon whether the regular clutch or gear means is in low, second or high position. When it is desired to reverse the tractor, the combined sliding driving clutch pinion 29 is moved forward on the spline shaft thereby causing it to engage idler gear 43 which in turn engages gear 47 of spool gear 45 thereby causing gear 48 mounted on the opposite end of spool gear 45 to revolve, which in turn engages driven gear 19 which manifestly operates transmission drive shaft gear 22, which in turn is operatively connected with the regular tractor transmission.

It will be manifest from this train of gears that the direction of the driving pinion when in engagement with idler gear 43 is opposite to that of driven gear 19. The engine driven spline shaft is then idly turning in its bearing 24 in the driven gear 19. Manifestly, the rate of speed in reverse is therefore determined by whether or not the regular clutch means (not shown) is in low, second or high position. Thus is provided three speeds in reverse for the said tractor.

Idler gear 43 is obviously positioned in the lower part of the transmission housing so that it is ordinarily at all times in contact with oil in said housing and thereby acts as a pump in discharging the lubricant to the other gears thereby providing complete lubrication for the same. The shaft mounting bracket 38 being under-slung as respects the engine driven spline shaft 27 provides for such mounting of the idler gear. Having the said bracket mounted upon the shifter housing provides for a compact arrangement of the parts leaving not an eighth of an inch space between the said bracket and the regular clutch mechanism (not shown).

Providing the shaft mounting recess 24 with the ball bearing, and by providing the driven gear 19 in the form of a ring gear pressed upon the bearing 20, and by providing the ball bearing 23 on the opposite side of the clutch, a mounting is provided characterized by rigidity against axial deflection.

The shifter fork 32 being rigidly mounted on shifter shaft 33, and this in turn being operatively connected to shifter lever 46, provides for longitudinally directed movement of the shifter fork 32 and through it longitudinally directed movement of the combined sliding driving clutch pinion 29.

The above arrangement provides for a disposition of the parts characterized by providing against wear so that an exceptionally efficient device is provided.

Obviously, changes may be made in the form, dimensions and arrangement of the parts of our invention, without departing from the principle thereof, the above setting forth only a preferred form of embodiment.

We claim:

1. A device of the character described embodying a transmission housing plate; a driven gear rotatively mounted on said plate; an engine driven spline shaft having one end rotatively mounted in said driven gear; a shifter housing; a shaft mounting bracket mounted on said housing; a gear mounting shaft having one end mounted on said plate and the other end mounted in said bracket; a gear spool with two gears rotatively mounted on said shaft, one of said gears meshing with said driven gear; a second gear mounting shaft having one end mounted on said plate and the other end mounted in said bracket; an idler gear mounted on said second shaft, said idler gear meshing with the other gear of said spool; a combined sliding driving and clutch pinion operatively disposed on said engine driven spline shaft with respect to said idler and driven gears; a shifter fork shaft operatively mounted in said shifter housing; a shifter fork fixedly mounted on said shaft and operatively engaged with said combined sliding driving and clutch pinion; and means to actuate said shifter shaft.

2. In a device of the character described for a tractor, the combination of a transmission housing for transmission mechanism, said housing having a power take-off port and port flange; a gear shifting housing having a collar partially closing said port, mounted on said port flange; and a transmission gear shaft mounting bracket having a collar secured to said collar of said gear shifting housing, said bracket being inwardly directed with respect to said gear shifting housing collar and being wholly disposed in said transmission housing, whereby compactness is afforded for said transmission mechanism.

3. In a device of the character described for a tractor, the combination of a transmission housing plate; a driven gear having an axially disposed shaft mounting recess; a drive shaft having splines intermediate its ends and a round end operatively mounted in said recess of said driven gear; a shaft mounting bracket underslung as respects said drive shaft; a gear spool shaft and idler gear shaft each of said shafts having one end mounted on said transmission housing plate and the other end mounted on said bracket; a gear spool mounted on said spool shaft; and an idler gear mounted on said idler shaft.

4. In a device of the character described for a tractor, the combination of a transmission housing plate; a driven gear having an axially disposed shaft mounting recess, said gear being operatively mounted in said plate; a drive shaft having splines intermediate its ends and a round end operatively mounted in said recess of said driven gear; a driving clutch pinion operatively mounted upon said drive shaft; a shaft mounting bracket underslung as respects said drive shaft; shafts having bearings as respects one end thereof in said transmission housing plate and as respects the other end in said bracket; an idler gear operatively mounted on one of said shafts, adapted when desired, to intermesh with said driving clutch pinion; and a spool gear operatively mounted on said other shaft, one part of said spool gear intermeshing with said idler gear and the other part intermeshing with said driven gear.

5. In a device of the character described for a tractor, the combination of a transmission housing plate; a driven gear rotatively mounted in said plate, said driven gear having an axially disposed shaft mounting recess, and having integrally formed thereon a shoulder bearing, whereby said gear may be mounted in said transmission housing plate; and a ring gear fixedly mounted upon said shoulder bearing, said shoulder bearing ending in clutch jaws outside of said ring gear.

In witness whereof we hereunto subscribe our names this 31st day of March, A. D. 1927.

ALVIN R. CAMPBELL.
CHARLES D. DRAPER.